(12) United States Patent
Hamerski et al.

(10) Patent No.: US 11,600,448 B2
(45) Date of Patent: Mar. 7, 2023

(54) CAPACITOR COMPRISING A PLURALITY OF CAPACITOR UNITS

(71) Applicant: Bayerische Motoren Werke Aktiengesellschaft, Munich (DE)

(72) Inventors: Roman Hamerski, Unterhaching (DE); Carsten Riefle, Zorneding (DE); Minghua Tang, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 250 days.

(21) Appl. No.: 16/438,707

(22) Filed: Jun. 12, 2019

(65) Prior Publication Data

US 2019/0362898 A1 Nov. 28, 2019

Related U.S. Application Data

(63) Continuation of application No. PCT/EP2018/054547, filed on Feb. 23, 2018.

(30) Foreign Application Priority Data

Feb. 27, 2017 (DE) .................... 10 2017 203 106.9

(51) Int. Cl.
*H01G 4/38* (2006.01)
*H01G 4/228* (2006.01)

(52) U.S. Cl.
CPC .............. *H01G 4/38* (2013.01); *H01G 4/228* (2013.01)

(58) Field of Classification Search
CPC ................................ H01G 4/38; H01G 4/228
See application file for complete search history.

(56) References Cited

U.S. PATENT DOCUMENTS

| 2003/0031038 A1* | 2/2003 | Shirakawa | ............ H02M 7/003 363/144 |
| 2007/0109715 A1* | 5/2007 | Azuma | .................... B60K 6/28 361/299.3 |

FOREIGN PATENT DOCUMENTS

| EP | 1 788 596 A1 | 5/2007 | |
| EP | 2 234 129 A2 | 9/2010 | |
| JP | 2004-165309 A | 6/2004 | |
| JP | 2010021316 A | * 1/2010 | ............ H01G 4/224 |
| JP | 2011-258848 A | 12/2011 | |

OTHER PUBLICATIONS

International Search Report (PCT/ISA/210) issued in PCT Application No. PCT/EP2018/054547 dated Apr. 17, 2018 with English translation (five (5) pages).

German-language Written Opinion (PCT/ISA/237) issued in PCT Application No. PCT/EP2018/054547 dated Apr. 17, 2018 (six (6) pages).

German-language Search Report issued in counterpart German Application No. 10 2017 203 106.9 dated Dec. 21, 2017 with partial English translation (15 pages).

* cited by examiner

*Primary Examiner* — Eric W Thomas
(74) *Attorney, Agent, or Firm* — Crowell & Moring LLP

(57) ABSTRACT

A capacitor has at least two capacitor units, wherein a first capacitor unit and a second capacitor unit of the at least two capacitor units have opposite polarities.

15 Claims, 3 Drawing Sheets

CAPACITOR COMPRISING A PLURALITY OF CAPACITOR UNITS

CROSS REFERENCE TO RELATED APPLICATIONS

This application is a continuation of PCT International Application No. PCT/EP2018/054547, filed Feb. 23, 2018, which claims priority under 35 U.S.C. § 119 from German Patent Application No. 10 2017 203 106.9, filed Feb. 27, 2017, the entire disclosures of which are herein expressly incorporated by reference.

BACKGROUND AND SUMMARY OF THE INVENTION

The present invention relates to a capacitor and to a vehicle having such a capacitor.

A capacitor normally has a plurality of capacitor units. FIG. 1 shows an electrical capacitor 10 known from the prior art having a plurality of capacitor units or capacitor windings 11, 12, 13, 14 and 15. The capacitor is provided, within one plane, with capacitor windings 11, 12, 13, 14 and 15 connected in parallel. These capacitor windings have the same polarity, as shown in FIG. 1. The capacitor units 11, 12, 13, 14 and 15 are arranged next one another in a row. The positive poles of the capacitor windings 11, 12, 13, 14 and 15 are arranged on the same side and connected to the positive busbar of the capacitor 10. In a similar manner, the negative poles of the capacitor windings 11, 12, 13, 14 and 15 are arranged on the other same side and connected to the negative busbar of the capacitor. All of the capacitor windings 11, 12, 13, 14 and 15 in the capacitor 10 are normally charged with the same potential.

The magnetic or electromagnetic field 19 indicates the situation of the electromagnetic field, induced by the capacitor 10, inside and outside of the capacitor 10. The length and size of the arrows indicate the strength of the electromagnetic field at the respective location. As clearly shown in FIG. 1, the parallel arrangement and the identical polarity of the capacitor windings 11, 12, 13, 14 and 15 results in the amplification of the overall electromagnetic field outside of the capacitor 10. Inside the capacitor 10, the electromagnetic field 19 is reduced.

The formation of a relatively large or larger overall electromagnetic field also directly has negative effects on both the acoustics and the electromagnetic compatibility (EMC), which can adversely affect the compatibility of the capacitor with other electrical components. Furthermore, a relatively high stray inductance in the commutation circuit results. This leads to a high overvoltage at the switching element, as a result of which the switching current generally has to be limited. The poor EMC furthermore necessitates additional EMC filtering, which is reflected in increased component costs.

Proceeding from this, the object of the present invention is to provide a capacitor having a reduced electromagnetic field outside of the capacitor. Furthermore, the costs and the installation space of the capacitor should not be significantly increased.

This object is achieved by a capacitor according to the invention comprising at least two capacitor units, wherein a first capacitor unit and a second capacitor unit of the at least two capacitor units have opposite polarity.

An alternating, parallel arrangement of the capacitor windings is proposed. The adjacent capacitor windings have an opposite polarity, as a result of which the electromagnetic field is amplified locally between capacitor windings; at the same time, the overall electromagnetic field outside of the capacitor winding is weakened. Advantageously, the inherent inductance of the capacitor can be significantly reduced.

According to one development of the invention, a first capacitor unit and a second capacitor unit of the at least two capacitor units are arranged in parallel with respect to their spatial alignment.

According to one development of the invention, the at least two capacitor units are arranged next to one another in a capacitor unit row.

According to one development of the invention, the capacitor has a housing, which contains the at least two capacitor units.

According to one development of the invention, the capacitor has a first capacitor connection and a second capacitor connection.

According to one development of the invention, the at least two capacitor units each have a first electrical connection and a second electrical connection, wherein the first electrical connections of the at least two capacitor units are arranged next to one another in a first row and the second electrical connections of the at least two capacitor units are arranged next to one another in a second row.

According to one development of the invention, the first capacitor connection makes electrical contact with the first electrical connection of the first capacitor unit and with the second electrical connection of the second capacitor unit, wherein the second capacitor connection makes electrical contact with the second electrical connection of the first capacitor unit and with the first electrical connection of the second capacitor unit.

The first capacitor connection preferably has a first contact-making part and a second contact-making part, wherein the first contact-making part of the first capacitor connection is electrically connected to the first electrical connection of the first capacitor unit and a second contact-making part of the capacitor connection is electrically connected to the second electrical connection of the second capacitor unit.

The second capacitor connection preferably has a first contact-making part and a second contact-making part, wherein the first contact-making part of the second capacitor connection is electrically connected to the second electrical connection of the first capacitor unit and a second contact-making part of the second capacitor connection is electrically connected to the first electrical connection of the second capacitor unit.

The first and the second capacitor units are preferably arranged at a distance from one another.

According to one development of the invention, the capacitor has a third capacitor unit, wherein the first, second and third capacitor units are arranged in parallel with one another and wherein the second capacitor unit and third capacitor unit have opposite polarity.

According to one development of the invention, the first capacitor connection is electrically connected to the first electrical connection of the third capacitor unit, wherein the second capacitor connection is electrically connected to the second electrical connection of the third capacitor unit.

According to one development of the invention, the first capacitor unit, the second capacitor unit and/or the third capacitor unit are a film capacitor.

The present invention also provides an electric vehicle or a hybrid vehicle comprising an above-mentioned capacitor.

According to the invention, a low inherent inductance of the capacitor can be achieved. The design is comparable to that of a conventional film capacitor. As a result, it is possible to retain the rectangular shape of the capacitor. This has the advantage that existing capacitors can be replaced with new capacitors in inverters with a relatively low level of outlay. Since the invention also provides a busbar guidance system that is adapted to the capacitor windings, a parallel and close guidance of positive and negative busbars with overlapping on the end side of the capacitor is achieved. Therefore, entanglements can be prevented.

By retaining the rectangular shape of the capacitor, it is also easily possible to use the new capacitors in the existing inverters, as a result of which no further redesign measures arise. Furthermore, the component material of the busbar guidance system can be saved. Therefore, the capacitor according to the invention can be realized in a cost-effective manner.

Other objects, advantages and novel features of the present invention will become apparent from the following detailed description of one or more preferred embodiments when considered in conjunction with the accompanying drawings.

The exemplary embodiments explained below illustrate preferred embodiments of the present invention.

DETAILED DESCRIPTION OF THE DRAWINGS

Figure 2:
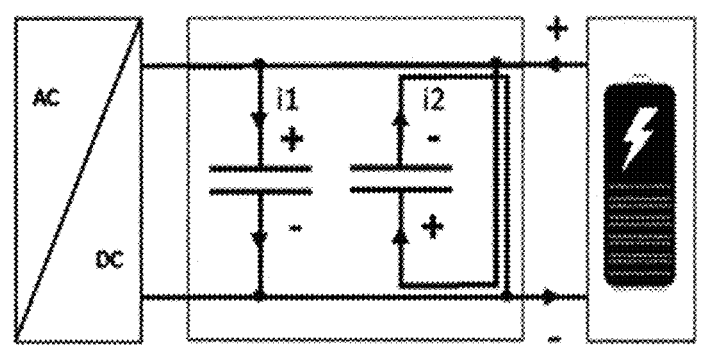
FIG. 2 is an electrical equivalent circuit diagram of the capacitor according to the invention comprising two capacitor units having opposite polarity.

To reduce the inherent inductance of the capacitor, the invention proposes an oppositely polarized or alternating arrangement of the capacitor units. FIG. 2 shows an electrical equivalent circuit diagram (ECD) of a capacitor according to the invention comprising two capacitor units or capacitor windings with connection of the HV battery (on the right in FIG. 2) and to the power electronics system (on the left in FIG. 2). The current i1 flows through via a first capacitor unit. The current i2 flows through via the second capacitor unit. The positive pole of the first capacitor unit is connected to the positive pole of the HV battery, whereas the negative pole of the first capacitor unit is connected to the negative pole of the HV battery. The positive pole of the second capacitor unit is connected to the positive pole of the HV battery, whereas the negative pole of the second capacitor unit is connected to the negative pole of the HV battery.

As illustrated in FIG. 2, the two capacitor units have opposite polarity, that is to say the positive pole of the first capacitor unit and the negative pole of the second capacitor unit are arranged next to one another on the same plane. In a similar manner, the negative pole of the first capacitor unit and the positive pole of the second capacitor unit are arranged next to one another on the same second plane.

Owing to the oppositely polarized capacitor units, the overall electromagnetic field outside of the capacitor can be reduced. At the same time, the electromagnetic field is amplified locally between capacitor units.

Figure 3:
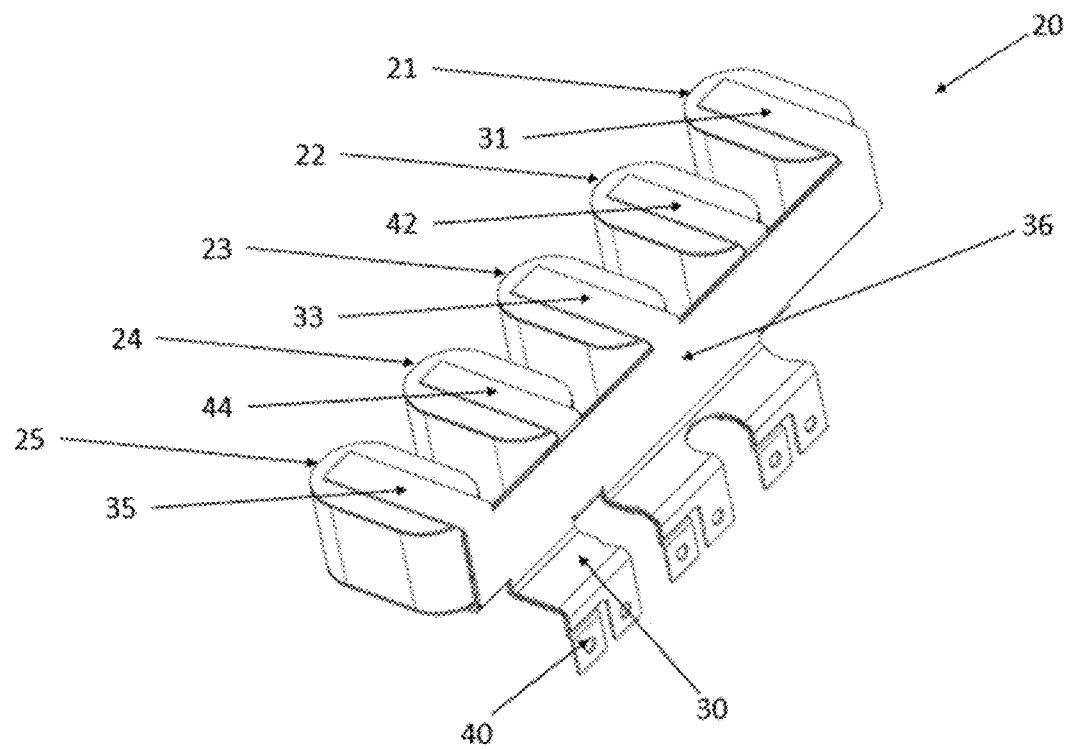
FIG. 3 shows an exemplary embodiment of the capacitor according to the invention comprising the capacitor units having opposite polarity.

FIG. 3 shows an embodiment of the capacitor 20 according to the invention. The capacitor 20 has capacitor units or capacitor windings 21, 22, 23, 24 and 25, a first busbar or capacitor connection 30 and a second busbar or capacitor connection 40.

The capacitor windings 21, 22, 23, 24 and 25 are arranged next one another in parallel, as illustrated in FIG. 3. The capacitor windings 21, 22, 23, 24 and 25 each have a first electrical connection on the top side and a second electrical connection on the bottom side. The top sides of the capacitor windings 21, 22, 23, 24 and 25 are arranged next to one another in series on the same plane, whereas the bottom sides of the capacitor windings 21, 22, 23, 24 and 25 are arranged on another plane.

The first busbar 30 has the contact-making parts 31, 32, 33, 34 and 35. The first busbar 30 is electrically connected to the first, that is to say top, electrical connection of the capacitor winding 21 by means of the contact-making part 31. The contact-making part 32 (FIG. 4) is electrically connected to the second, that is to say bottom, electrical connection of the capacitor winding 22. The first busbar 30 is electrically connected to the first electrical connection of the capacitor winding 23 by means of the contact-making part 33. The contact-making part 34 (FIG. 4) is electrically connected to the second electrical connection of the capacitor winding 24. The contact-making part 35 is electrically connected to the first electrical connection of the capacitor winding 25.

Figure 4:
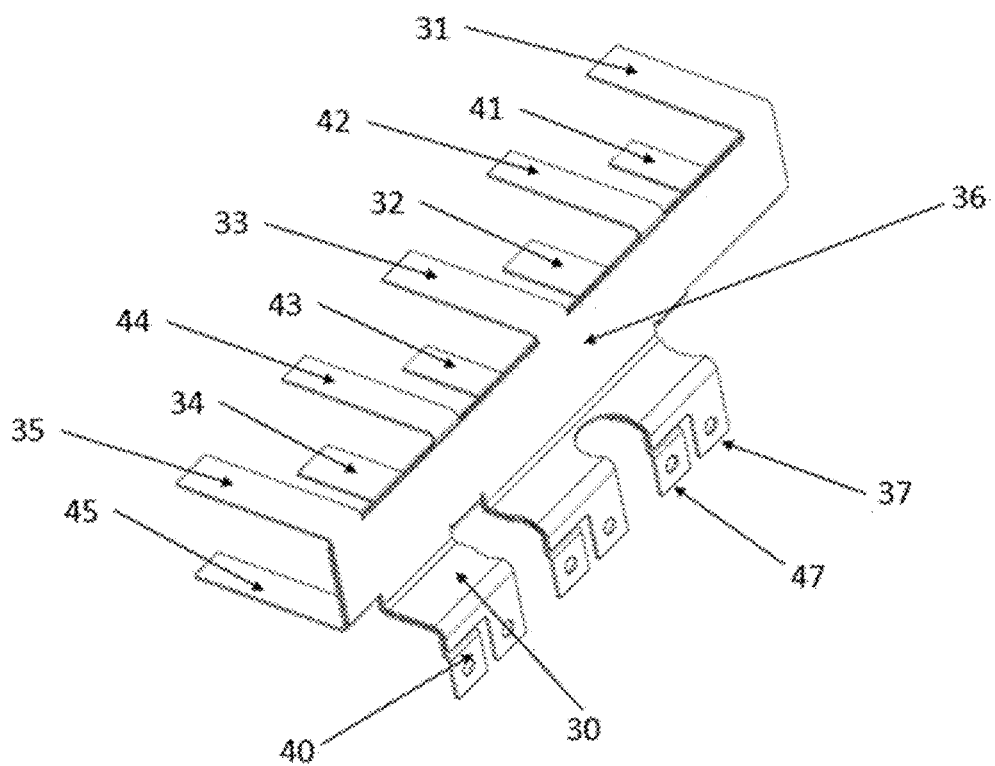
FIG. 4 shows the busbars of the capacitor according to the invention.

To illustrate the busbar guidance system, FIG. 4 inclusively shows the busbars or capacitor connections 30 and 40 of the capacitor 20 illustrated in FIG. 3. As illustrated in FIG. 4, the second busbar 40 has the contact-making parts 41, 42, 43, 44 and 45. In contrast to the first busbar 30, the second busbar 40 is electrically connected to the second, that is to say bottom, electrical connection of the capacitor winding 21 by means of the contact-making part 41. The contact-making part 42 is electrically connected to the first, that is to say top, electrical connection of the capacitor winding 22. The second busbar 40 is electrically connected to the second electrical connection of the capacitor winding 23 by means of the contact-making part 43. The contact-making part 44 is electrically connected to the first electrical connection of the capacitor winding 24. The contact-making part 45 is electrically connected to the second electrical connection of the capacitor winding 25.

Furthermore, the busbars 30 and 40 each have a connection 37 and a connection 47. The connections 37 and 47 serve to electrically connect the capacitor 20 to the IGBT module.

Figure 1:
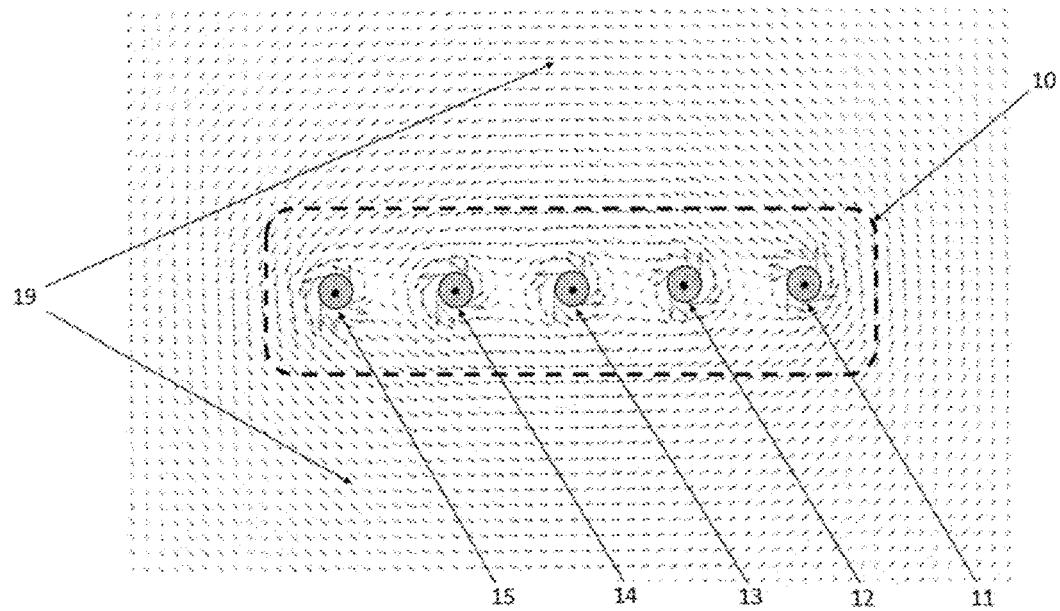
FIG. 1 shows a capacitor known from the prior art.
Figure 5:
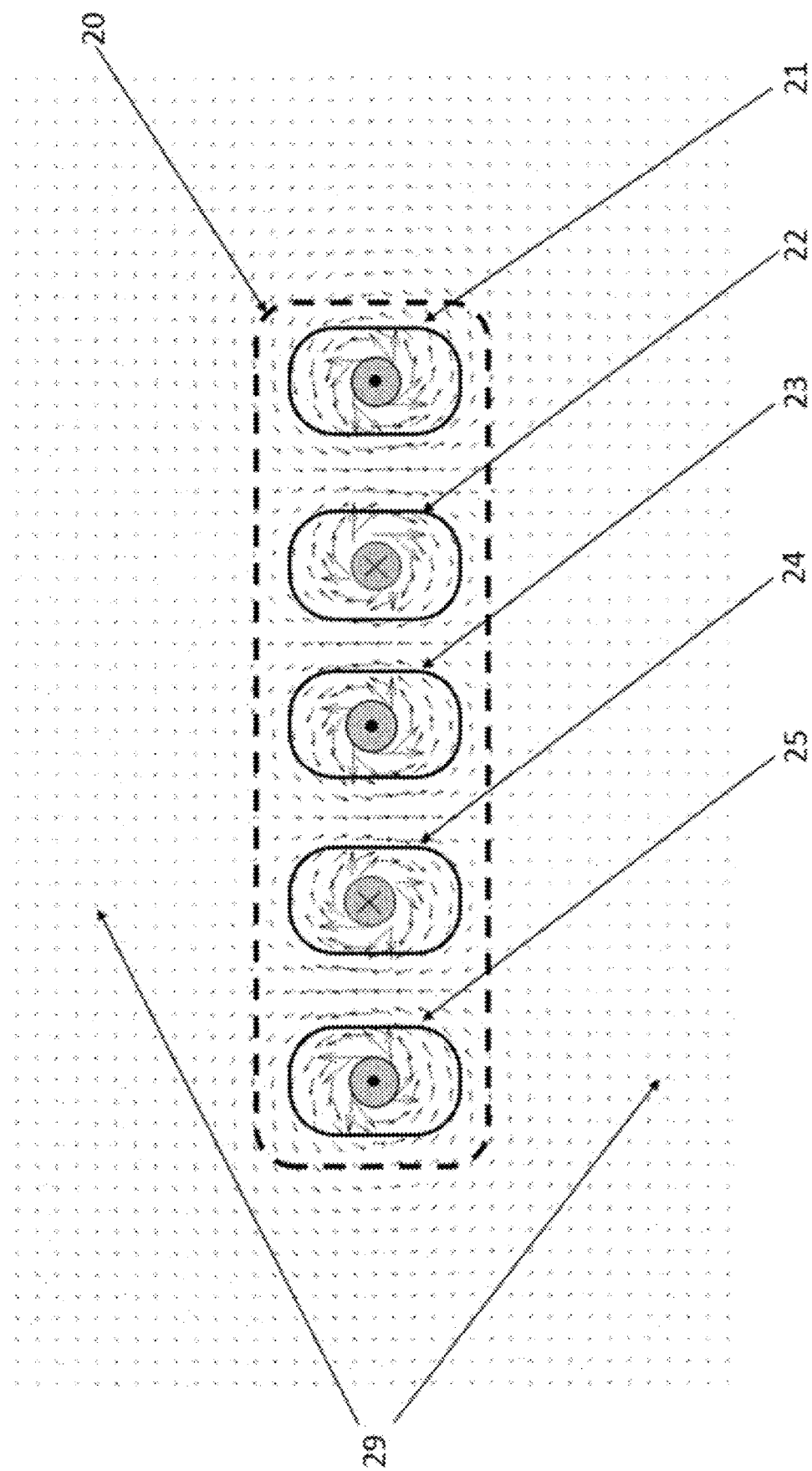
FIG. 5 is a schematic plan view of the capacitor according to the invention and its resulting magnetic field.

FIG. 5 shows the schematic capacitor 20 comprising the capacitor windings 21, 22, 23, 24 and 25 and its resulting electromagnetic field 29 from the capacitor 20, wherein two adjacent capacitor windings always have an opposite polarity. The length and size of the arrows indicate the strength of the electromagnetic field 29 at the respective location. In contrast to the electromagnetic field 19 in FIG. 1, the illustration in FIG. 5 illustrates that the electromagnetic field 29 or the arrows outside of the capacitor 20 are relatively smaller and shorter. Therefore, the overall electromagnetic field 29 is weakened. At the same time, the electromagnetic field 29 inside the capacitor 20 is amplified between capacitor windings 21, 22, 23, 24 and 25.

A relatively low electromagnetic field can advantageously be realized outside of the capacitor owing to the capacitor windings with opposite polarity arranged next to one another. The weakening of the electromagnetic field outside of the capacitor leads to an improved performance with respect to acoustics and EMC.

The capacitor 20 can be implemented by way of the film capacitor. It is possible to retain the rectangular shape of the capacitor winding. By retaining the rectangular shape of the capacitor, it is also easily possible to use the new capacitors in the existing inverters, as a result of which no further redesign measures arise.

Furthermore, a parallel and close guidance of positive and negative busbars 30 and 40 with overlapping on the end side 36 of the capacitor 20 is provided. Therefore, in addition to a reduction of the inherent inductance in the capacitor 20, entanglements can be prevented.

Furthermore, the component material can be exploited in order to save the raw material, for example copper, of the busbars. Therefore, the production costs can be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A capacitor, comprising:
   at least two capacitor units, wherein
   a first capacitor unit and a second capacitor unit of the at least two capacitor units have opposite polarity,
   the at least two capacitor units each have a first electrical connection and a second electrical connection,
   the first electrical connections of the at least two capacitor units are arranged next to one another in a first row within a first plane at a top side of the at least two capacitor units,
   the second electrical connections of the at least two capacitor units are arranged next to one another in a second row within a second plane at a bottom side of the at least two capacitor units, and
   for each of the at least two capacitor units, the first electrical connection is arranged opposite to the second electrical connection along a short axis of the respective capacitor unit.

2. The capacitor according to claim 1, wherein
   the first capacitor unit and the second capacitor unit of the at least two capacitor units are arranged in parallel with respect to their spatial alignment.

3. The capacitor according to claim 2, wherein
   the at least two capacitor units are arranged next to one another in a capacitor unit row.

4. The capacitor according to claim 1, wherein
   the at least two capacitor units are arranged next to one another in a capacitor unit row.

5. The capacitor according to claim 1, wherein
   the capacitor has a housing, which contains the at least two capacitor units.

6. The capacitor according to claim 1, wherein
   the capacitor has a first capacitor connection and a second capacitor connection.

7. The capacitor according to claim 6, wherein
   the first capacitor connection makes electrical contact with the first electrical connection of the first capacitor unit and with the second electrical connection of the second capacitor unit, and
   the second capacitor connection makes electrical contact with the second electrical connection of the first capacitor unit and with the first electrical connection of the second capacitor unit.

8. The capacitor according to claim 7, wherein
   the first capacitor connection has a first contact-making part and a second contact-making part,
   the first contact-making part of the first capacitor connection is electrically connected to the first electrical connection of the first capacitor unit, and
   the second contact-making part of the capacitor connection is electrically connected to the second electrical connection of the second capacitor unit.

9. The capacitor according to claim 8, wherein
   the second capacitor connection has a first contact-making part and a second contact-making part,
   the first contact-making part of the second capacitor connection is electrically connected to the second electrical connection of the first capacitor unit, and
   the second contact-making part of the second capacitor connection is electrically connected to the electrical connection of the second capacitor unit.

10. The capacitor according to claim 7, wherein
    the second capacitor connection has a first contact-making part and a second contact-making part,
    the first contact-making part of the second capacitor connection is electrically connected to the second electrical connection of the first capacitor unit, and
    the second contact-making part of the second capacitor connection is electrically connected to the electrical connection of the second capacitor unit.

11. The capacitor according to claim 6, wherein
    the capacitor has a third capacitor unit,
    the first, second and third capacitor units are arranged in parallel with one another, and
    the second capacitor unit and third capacitor unit have opposite polarity.

12. The capacitor according to claim 11, wherein
    the first capacitor connection is electrically connected to a first electrical connection of the third capacitor unit, and
    the second capacitor connection is electrically connected to a second electrical connection of the third capacitor unit.

13. The capacitor according to claim 11, wherein
    one or more of the first capacitor unit, the second capacitor unit, and the third capacitor unit is a film capacitor.

14. The capacitor according to claim 1, wherein
    the first and the second capacitor units are arranged at a distance from one another.

15. An electric vehicle or hybrid vehicle comprising a capacitor according to claim 1.

* * * * *